(12) United States Patent
Guirguis

(10) Patent No.: US 6,701,705 B1
(45) Date of Patent: Mar. 9, 2004

(54) GAS-WALLED ROCKET NOZZLE

(75) Inventor: Raafat H. Guirguis, Fairfax, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 23 days.

(21) Appl. No.: 10/138,879

(22) Filed: Apr. 30, 2002

(51) Int. Cl.⁷ .................. B63H 11/00; B64G 9/00; F02K 9/00; F03H 9/00; F23R 9/00
(52) U.S. Cl. .................. 60/204; 60/251; 60/231; 60/770; 60/771
(58) Field of Search .................. 60/204, 251, 770, 60/231, 771; 239/265.71

(56) References Cited

U.S. PATENT DOCUMENTS

| | | | | |
|---|---|---|---|---|
| 3,116,603 A | * | 1/1964 | Hausmann | 60/224 |
| 3,296,799 A | * | 1/1967 | Fuentes | 60/231 |
| 3,300,978 A | * | 1/1967 | Pennington | 60/231 |
| 3,302,884 A | * | 2/1967 | Robinson | 239/265.15 |
| 3,668,872 A | * | 6/1972 | Camp et al. | 60/207 |
| 3,740,945 A | * | 6/1973 | Lovingham | 60/204 |
| 3,759,039 A | * | 9/1973 | Williams | 60/231 |
| 4,686,824 A | * | 8/1987 | Dunaway et al. | 60/231 |
| 4,707,981 A | * | 11/1987 | Wagner | 60/242 |
| 6,354,074 B1 | * | 3/2002 | Jones et al. | 60/204 |
| 6,470,669 B2 | * | 10/2002 | Jones et al. | 60/231 |

* cited by examiner

*Primary Examiner*—Justine R. Yu
*Assistant Examiner*—William H. Rodriguez
(74) *Attorney, Agent, or Firm*—Mark Homer

(57) ABSTRACT

The present invention comprises a rocket motor nozzle that replaces the fixed-wall throat with a "wall" created by injecting gas radially into the nozzle. By injecting gas into the flow of combustion products that are going through the nozzle, this will deflect the combustion product flow, restricting and accelerating such flow, just as a fixed-wall does in a standard nozzle. However, by using the "gas-wall" described herein, no erosion will result at the restriction area.

17 Claims, 6 Drawing Sheets

GAS-WALLED ROCKET NOZZLE

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to nozzle design, more particularly to the nozzle design of rocket motors, and most particularly to a rocket motor nozzle design that uses injected gas to form the "throat" of the nozzle in order to alleviate erosion problems with traditional nozzle designs and allows the use of higher performance propellants within rocket motors.

2. Description of the Related Art

Rocket motors operate by generating large amounts of hot gases from the combustion of a propellant formulation. These combustion gases generate enough pressure within the rocket motor to force the gases out of any exhaust port at high velocity, thus producing thrust. However, for efficient conversion of the enthalpy of the combustion gases into kinetic energy, the exhaust port normally is a divergent/convergent nozzle with a restrictive orifice or throat area. The ratio between the area at the exit plane of the nozzle versus the area at the throat establish how efficiently the nozzle coverts the pressure in the mass flow stream to thrust produced by the rocket motor.

One of the major problems associated with current nozzle designs is that the throat of the nozzles are particularly susceptible to erosion as a result of hot combustion gases and other additives to propellants, such as metal particles to increase energy, as they flow through the nozzle. Many inventions have attempted to address this problem through the use of various erosion resistant coatings and materials, with limited success. Examples of such inventions are disclosed in U.S. Pat. No. 6,086,692, which describes advanced designs for high pressure and high performance solid propellant rocket motors, and, U.S. Pat. No. 6,209,312, which describes rocket motor nozzles having erosion-resistant liners. Due to the limitations inherent in using coatings and materials to address this problem, rocket motor designers are still forced to sacrifice performance by using propellants that do not provide maximum output so as not to unduly erode the throat of the nozzle.

A second problem associated with current nozzle designs for rocket motors relates to the inherent physical properties of a fixed-wall throat. In present rocket motors, the pressure within the combustion chamber is determined by balancing the rate of gas generation and the mass flow rate that can go through the nozzle. Because the rate of gas generation is usually proportional to $p^n$, where p is pressure and n is a constant, and the mass flow rate is normally proportional to p, in order for the rocket motor to be stable, n must be less than 1. This condition effectively limits the rate of burning by excluding a large number of propellant formulations which burn at high rates, but for which n>1.

Therefore, it is desired to provide a rocket nozzle having a throat that is not effected by erosion and a throat area that can quickly change in response to spontaneous changes in pressure such as to prevent the motor from developing a runaway pressure when using a propellant for which n>1. This will allow designers to optimize rocket motor designs to produce maximum thrust.

SUMMARY OF THE INVENTION

The present invention does not comprise a traditional convergent section in the otherwise traditional convergent/divergent nozzle. The restrictive effect of the throat is produced by injecting gas into the nozzle rather than providing a physical wall restriction. By using a "gas-wall", the present invention obviates the erosion problems associated with present nozzles as described above. Also, by using a gas-wall, the area of the throat can quickly change in response to spontaneous changes in pressure such as to prevent the motor from developing a runaway pressure when using a propellant for which n>1. The present invention thus allows for the use of fast burning propellants for which n>1, so rocket motor performance can be maximized.

Accordingly, it is an object of this invention to provide a nozzle wherein the restrictive effect of the throat is generated by an injected gas.

It is a further object of this invention to provide nozzles with improved erosion characteristics over present nozzles.

A still further object of this invention is to provide a rocket motor with increased performance capability over current rocket motors.

This invention accomplishes these objectives and other needs related to rocket nozzle design by providing a nozzle body with a divergent, but no convergent section, having no fixed-wall throat, that accepts the combustion products from a rocket motor at one end and allows the combustion products to exit at the other end. Means for circumferentially injecting gas radially and orthogonally to the nozzle body creates the effect of the throat of the nozzle wherein the combustion products are accelerated by restricting their flow.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The invention, as embodied herein, comprises a rocket motor nozzle that replaces the fixed-wall throat with a "wall" created by injecting gas radially into the nozzle. By injecting gas into the flow of combustion products that are going through the nozzle, this will deflect the combustion products flow, in a direction such as to restrict and accelerate this flow, just as a fixed-wall does in a standard nozzle.

However, by using the "gas-wall" described herein, no erosion will result in the convergent section or the throat. Also, if the pressure in the combustion chamber is accidentally increased, the injected gas will merely not penetrate as far into the nozzle, thus squeezing the flow of combustion products to a lesser degree, allowing more gases to go through, and dropping the pressure again to a safe value. Therefore, a catastrophic incident is easily avoided.

The present invention should operate based upon the following principles. The thrust produced by the rocket motor should be mostly generated by the main stream. The amount of injected gases should be small in comparison to the amount of gases flowing in the main stream. That is due to the following reasons:

1. The depth of penetration of the injected gas stream depends on the momentum of the combustion products flow. More specifically, the penetration depth depends upon the ratio of momentum of the injected gas divided by the momentum of the combustion products flow. Before acceleration in the nozzle, the combustion products flow is necessarily slow, therefore, the injected gas mass flow rate is small for a given depth of penetration.
2. The percentage reduction in the area of a circle (the general shape of a rocket motor/nozzle) is almost twice the percentage reduction in diameter. For example, reducing the diameter by 10% reduces the area by 19%. Reducing the diameter by 20% reduces the area by 36%.
3. The reduction in area needed to accelerate the combustion products to sound speed quickly decreases with increasing the Mach number M at the exit of the combustion chamber. For M=0.2, $\delta A/A \approx 2/3$, while for M=0.4, $\delta A/A \approx 1/3$.

Figure 1:
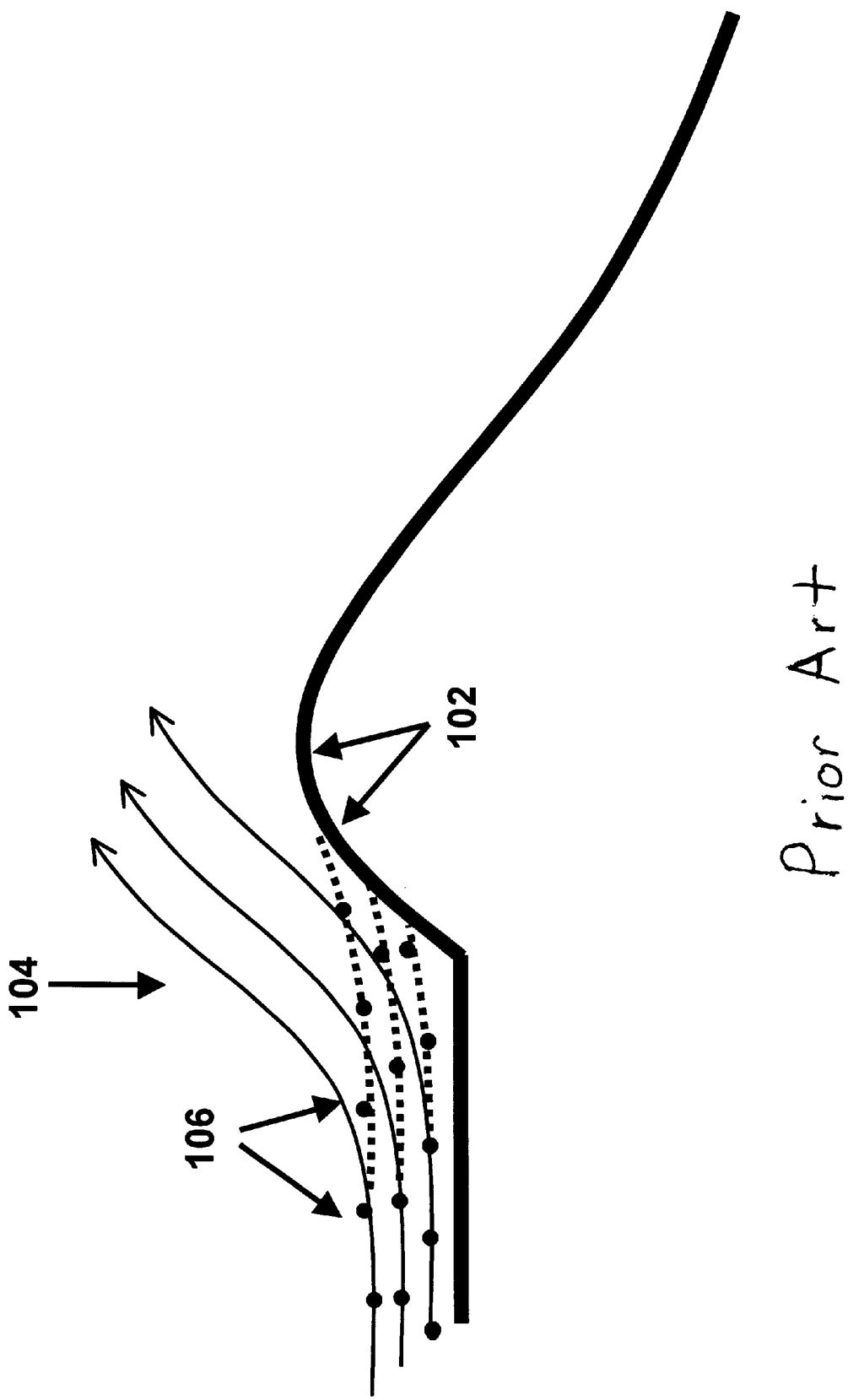
FIG. 1 shows gas flow around a fixed-wall throat within a prior art nozzle.

Referring to FIG. 1, a fixed-wall, prior art, nozzle is depicted. The fixed-wall throat 102 forces the flow of gases 104 around the throat 102. Solid metal oxide particles 106, resulting from combustion of the metal particles added to most rocket motor propellants to increase performance, cannot adjust to the restriction placed by the throat 102, and, thus, tend to impact the throat 102. This is due to the particles 106 being denser than the gas flow 104, and, therefore, the particles 106 cannot "turn" as easily as the gas flow 104 carrying them. This impact, along with the impact of the hot combustion gas flow 104, causes significant erosion of the throat 102. This, in turn, results in continually decreased performance.

Figure 2:
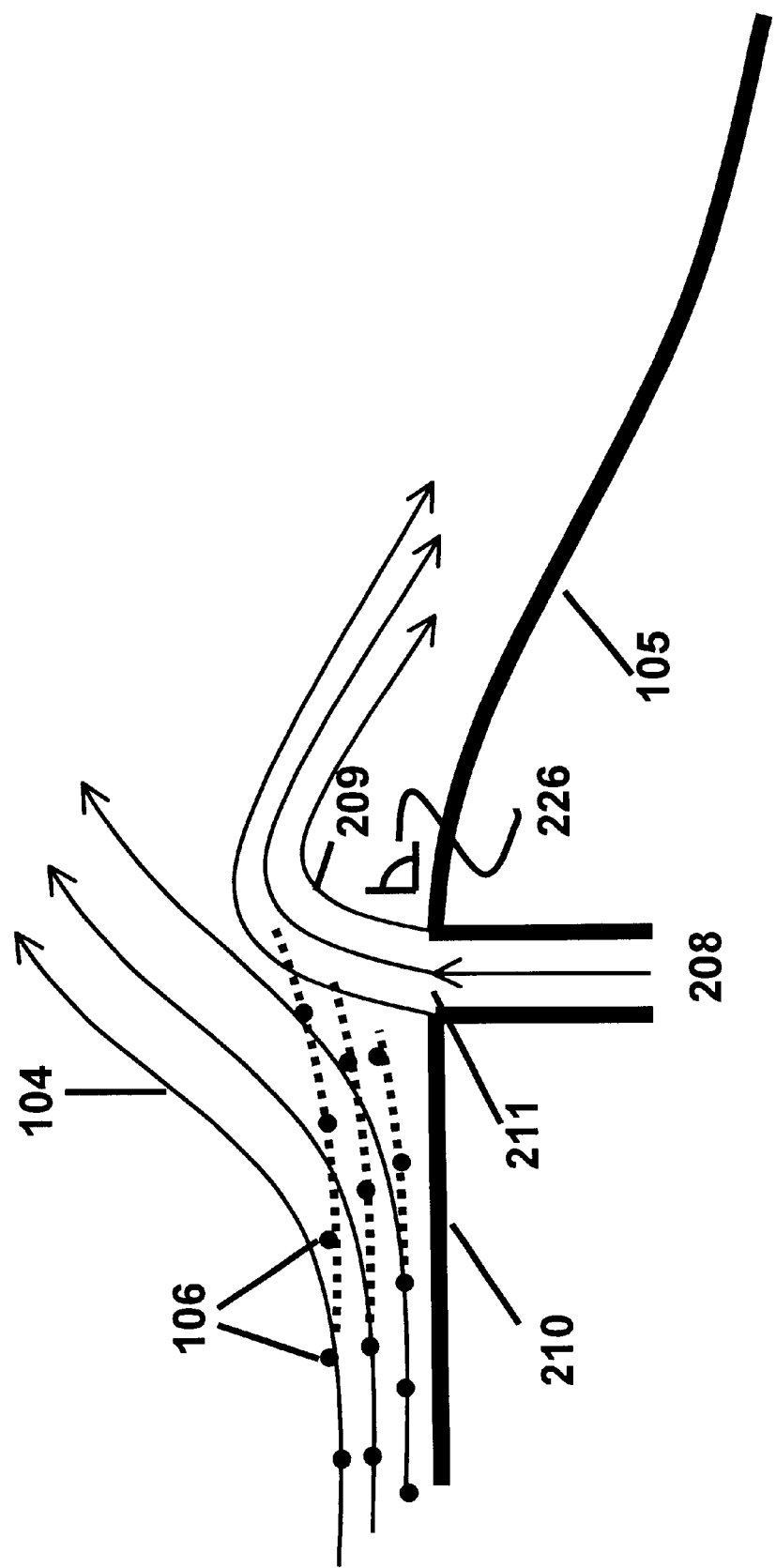
FIG. 2 shows gas flow around the gas-walled throat of the present invention.

FIG. 2 shows the "gas-walled" section of the present invention. The means for injecting gas 208, inject gas 209 through an injection port 211. The injected gas 209 now acts as the "throat" of the nozzle. The gas 209 is injected at an angle 226 substantially perpendicular to the nozzle body 210. The gas flow 104 is deflected by the injected gas 209 in the same manner. There is no "fixed-wall" that particles 106 can impact, therefore, no erosion problem. In addition, in a laminar flow (not turbulent) configuration whereby both gaseous streams 104 and 209 flow in an orderly fashion in adjacent, non-intermingling layers, the injected stream 209 will displace stream 104 away from the walls 105 of the divergent section. The gases in stream 209 will be the only gases that come in contact with these walls. Thus, in a preferred embodiment of the invention, the injected gas 209 is selected having temperatures ranging from about 1500 F. to about 2000 F., a substantially lower temperature than the gases of the main stream 104. The gas stream 104 can be as hot and as erosive as needed to increase the performance of the rocket motor without burning/eroding the walls 105 of the divergent section of the nozzle. However, the means for injecting gas 208, should generate gas 209 at a pressure significantly higher than that of the main stream 104 in order to inject these gases 209 at high speed into stream 104. For a traditional motor operating at about 2,000 psi, gases 209 should be generated at a pressure ranging between 2,500 psi and 3,000 psi. The pressure and angle of injection may be adjusted by one skilled in the art such as to replicate any desired nozzle profile.

Figure 3:
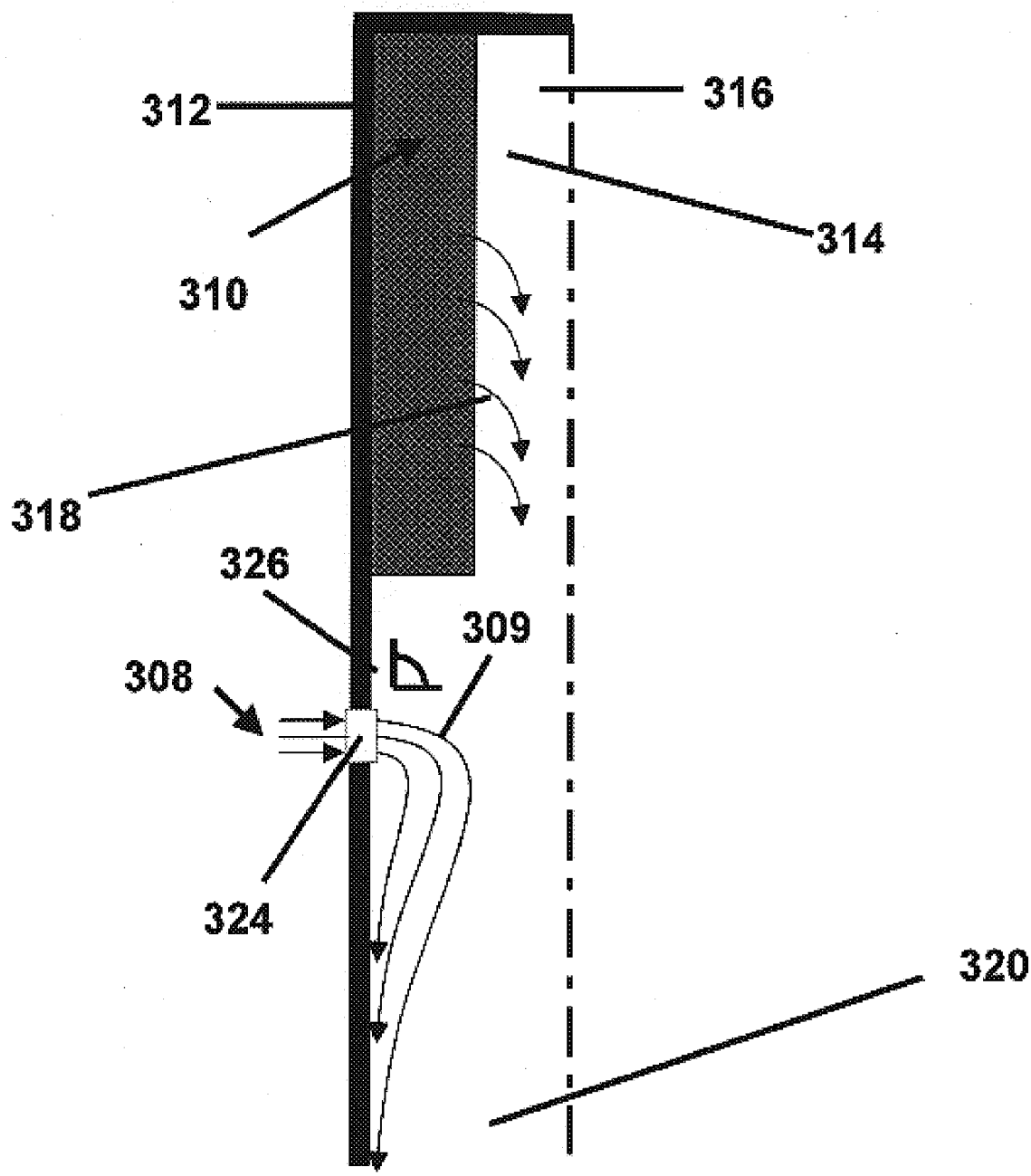
FIG. 3 shows an embodiment of the present invention with gas being injected through the side wall of the nozzle.

Referring to FIG. 3, a cut-away of half of a rocket motor employing the present invention is shown. The propellant grain 310 is placed radially inside the wall 312 of the combustion chamber 314 leaving a middle section 316 open so the combustion products may flow 318 toward the exit opening 320. Means for injecting gas 308 injects gas 309 radially through the wall 312 through a circumferentially continuous injection port 324 at a location below the propellant grain 310. The gas 309 is injected at an angle 326 substantially perpendicular to the wall 312. As discussed above, the combustion products flow 318 will be constricted and accelerated by the gas 309 in the same manner that a fixed-wall throat on a standard nozzle operates.

Figure 4:
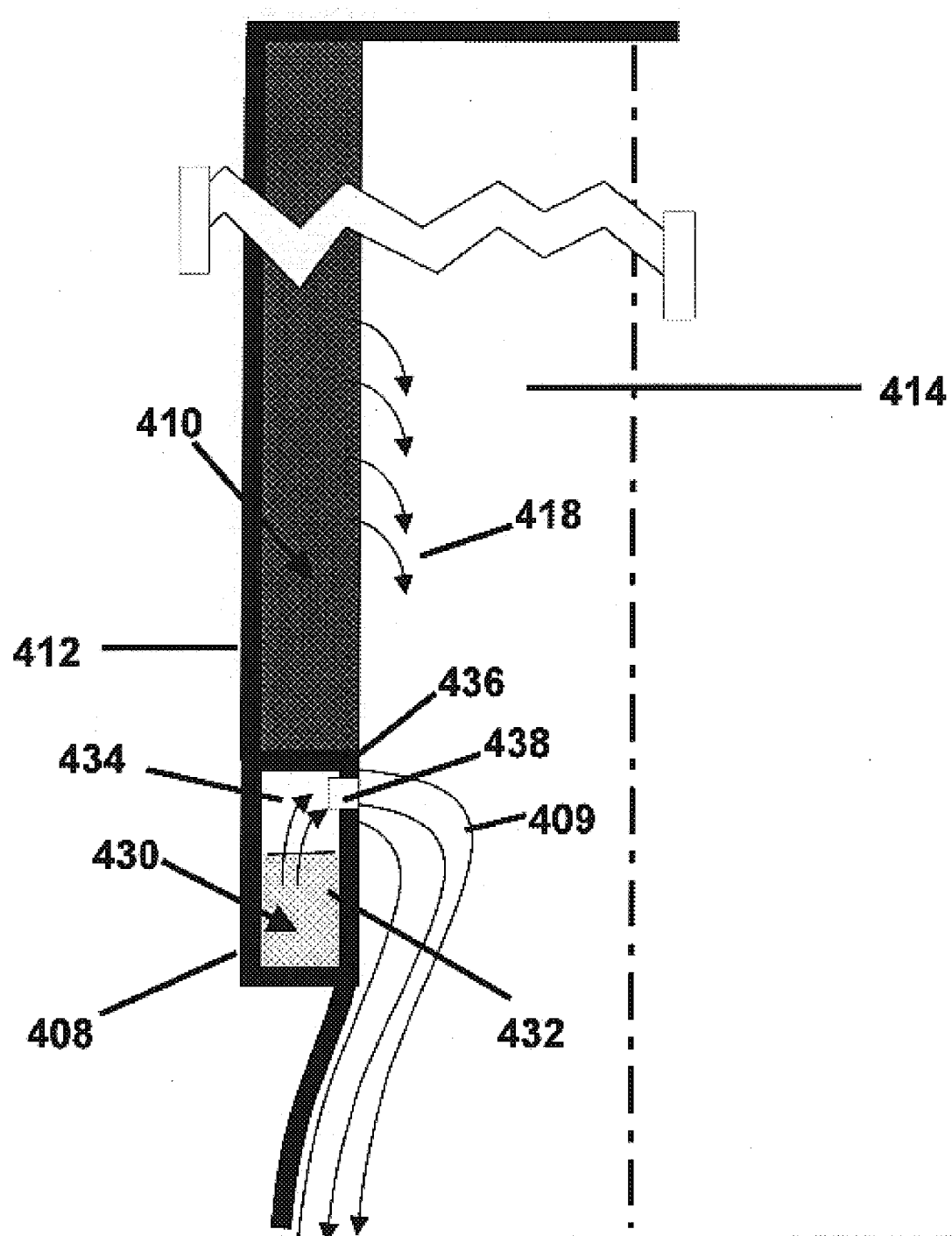
FIG. 4 shows an embodiment of the invention with gas being injected from a propellant placed radially on the inner wall of the nozzle.

The embodiment of the invention illustrated in FIG. 4 shows the details of one possible means for injecting gas 408. In this embodiment, the means for injecting gas 408 comprises a second propellant 430 placed radially around the inside of the wall 412. The second propellant 430 is placed closer to the exit opening 420 than the propellant grain 410. Propellant 430 is isolated in its own combustion chamber 432 extending from walls 412 but, having thicker, stronger walls 436. The combustion chamber 432 operates at a pressure higher than the pressure in the main combustion chamber 414 housing propellant 410. A space 434 is left in the housing 432 between housing wall 436 and the second propellant 430. This space gets larger as more of propellant 430 is consumed. The injection port 438 is located adjacent to the space 434. When the second propellant 430 is initiated, the gas 409 is injected through the injection port 438, wherein the flow of the combustion products 418 is restricted and accelerated. As depicted in the side-bar of FIG. 4, port 438 is a circumferentially continuous port the cross section of which is shaped similar to a convergent nozzle.

Figure 5:
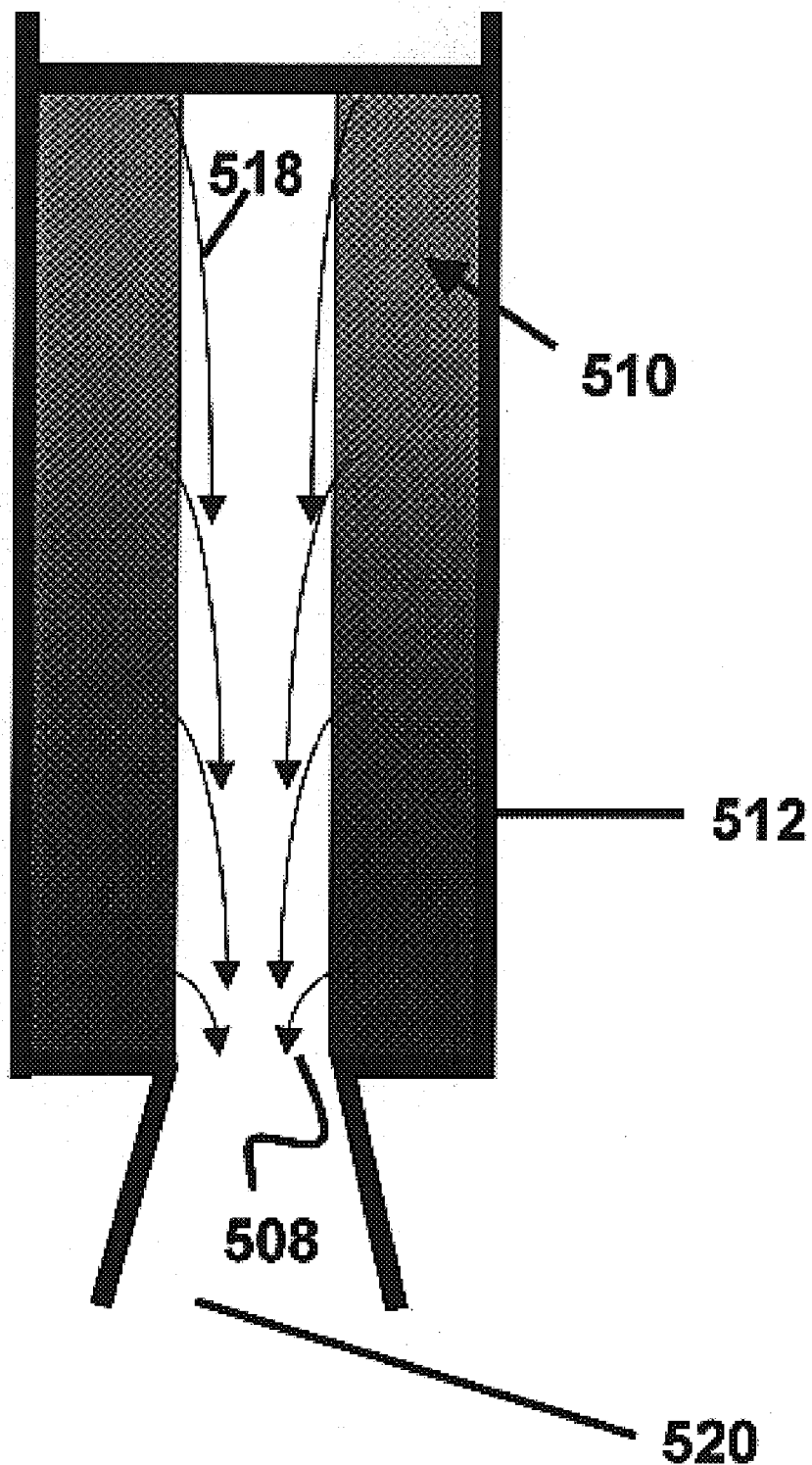
FIG. 5 shows an embodiment of the invention using an axially graded propellant with progressively higher burning rates toward the nozzle exit.

Referring to FIG. 5, another embodiment of the present invention is depicted. In this embodiment, an axially graded propellant grain 510, having a progressively higher burning rate as it extends towards the exit opening 520, is placed radially around the inside of the wall 512. There is no separate means for injecting gas 508. In operation, due to the progressively higher burning rate, the flow of combustion products 518 is automatically restricted toward the bottom of the propellant grain 510, and, therefore, is accelerated.

Figure 6:
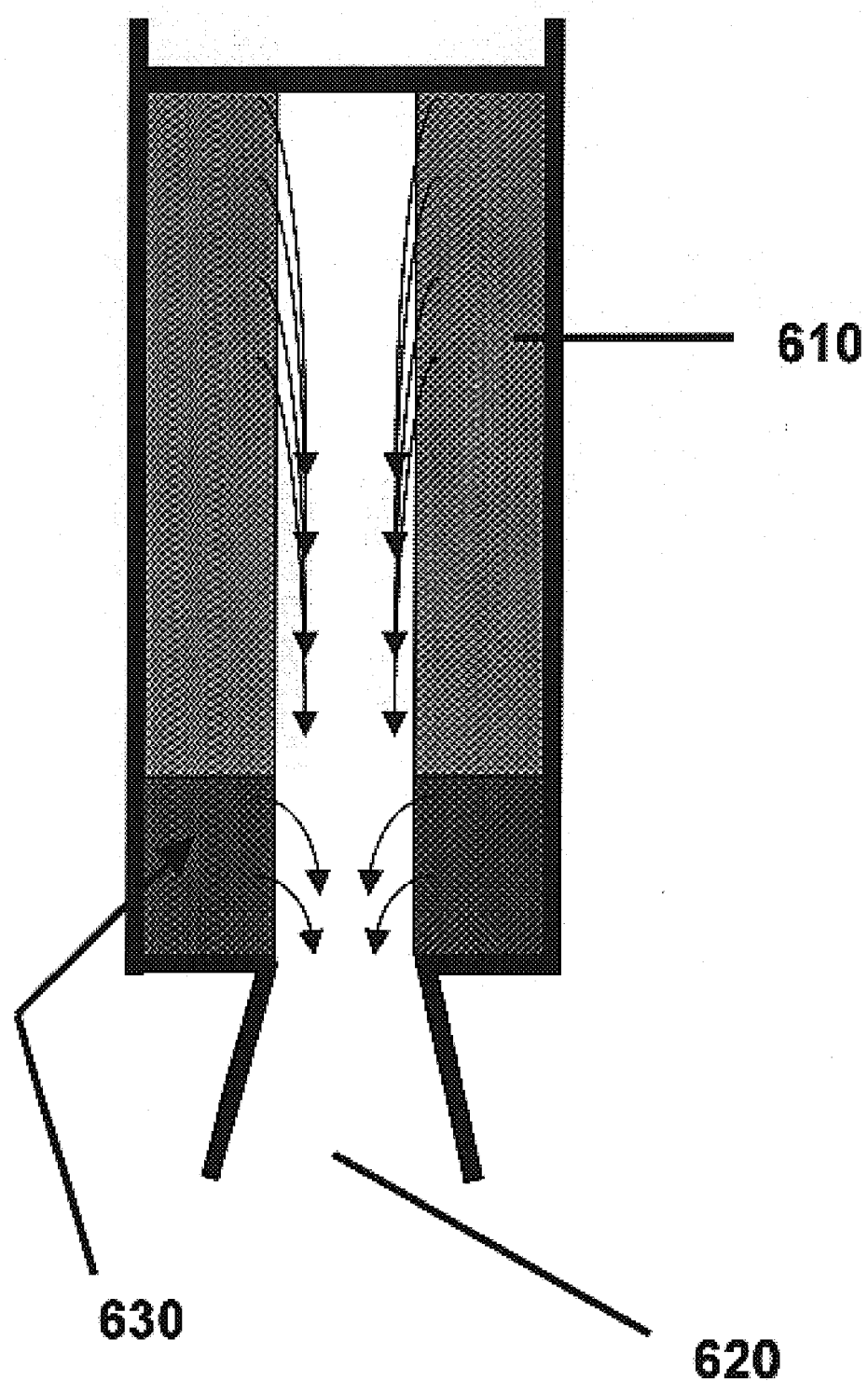
FIG. 6 shows an embodiment of the invention in which a higher burning rate propellant is added before the divergent section of the nozzle to produce the effect of the convergent section.

As depicted in another embodiment of the present invention illustrated FIG. 6, a result similar to the embodiment shown in FIG. 5 can be accomplished with a standard propellant 610, having a uniform burning rate, by replacing a short section of 610, near the exit opening 620, with a second propellant 630 having a significantly higher burning rate at the same pressure.

In the embodiments of the present invention described above, the convergent section of traditional convergent-divergent rocket nozzles is replaced with an alternative means of accelerating the combustion products to Mach number=1. The divergent section remains a traditional fixed-wall nozzle, but as explained above, referring to FIG. 1 and FIG. 2, by selecting the injected gas 209 cooler than the gases of the main stream 104, this divergent section is subjected to milder, less erosive conditions. Referring to FIG. 4, this is accomplished by proper selection of propellant 430. For example, propellant 430, may contain more ammonium perchlorate and less fuel/binder.

Finally, the invention also includes the method of accelerating the gas flow within a rocket motor as described above.

What is described are specific examples of many possible variations on the same invention and are not intended in a limiting sense. The claimed invention can be practiced using other variations not specifically described above.

What is claimed is:

1. A nozzle for accelerating the flow of combustion products, comprising:
    a hollow nozzle body having at least one open end wherein the flow of combustion products flows through the nozzle body and exits at the open end; and,
    means for injecting gas through a single port in a continuous circumference completely surrounding and at an angle to the nozzle body wherein the gas restricts and accelerates the flow of combustion products.

2. The nozzle of claim 1, wherein the gas is injected in a direction substantially perpendicular to the combustion products.

3. The nozzle of claim 2, further comprising a gas injection port having an opening through a wall of the nozzle body.

4. The nozzle of claim 1, wherein the means for injecting gas comprises a propellant placed radially against an inner wall of the nozzle body.

5. The nozzle of claim 4, further comprising a housing extending from the inner wall of the nozzle body and surrounding the propellant wherein the gas injection port comprises an opening within the housing.

6. The nozzle of claim 5, further comprising a space between one wall of the housing and the propellant.

7. The nozzle of claim 6, wherein the gas injection port comprises a location adjacent to the space.

8. The nozzle of claim 2, wherein the gas comprises a temperature ranging from about 1500 degrees farenheit to about 2000 degrees farenheit.

9. A solid propellant rocket motor, comprising:
    a rocket motor housing having inner and outer walls and an exit opening;
    a solid propellant located radially and around the inner wall of the rocket motor housing wherein initiation of the solid propellant creates flow of combustion products toward the exit opening;
    means for injecting gas through a single port in a continuous circumference completely surrounding and at an angle to the rocket motor housing wherein the gas restricts and accelerates the flow of combustion products.

10. The rocket motor of claim 9, wherein the means for injecting gas injects gas in a direction substantially perpendicular to the rocket motor housing.

11. The rocket motor of claim 10, wherein the means for injecting gas comprises a second propellant, having a burning rate higher than a burning rate of the solid propellant, placed radially against said inner wall of the rocket motor housing.

12. The rocket motor of claim 11, further comprising a second housing extending from the inner wall of the rocket motor housing and surrounding the second propellant having a gas injection port comprising an opening within the second housing.

13. The rocket motor of claim 12, further comprising a space between one wall of the second housing and the second propellant wherein the gas injection port comprises a location adjacent to the space.

14. The rocket motor of claim 9, wherein the means for injecting gas comprises an axially graded propellant wherein a burning rate of the axially graded propellant increases axially toward the exit opening.

15. A method of accelerating the flow of combustion products through a nozzle, comprising the step of:
    injecting gas through a single port in a continuous circumference completely surrounding radially around and continuously circumferential and at an angle to a nozzle body wherein the gas restricts and accelerates the flow of combustion products.

16. The method of claim 15, wherein the gas is injected in a direction substantially perpendicular to the nozzle body.

17. The method of claim 16, wherein the means for injecting gas comprises a propellant placed radially against an inner wall of the nozzle body.

* * * * *